June 23, 1953 — D. E. REED — 2,643,084
REARVIEW MIRROR APPARATUS
Original Filed Nov. 14, 1947
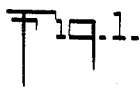
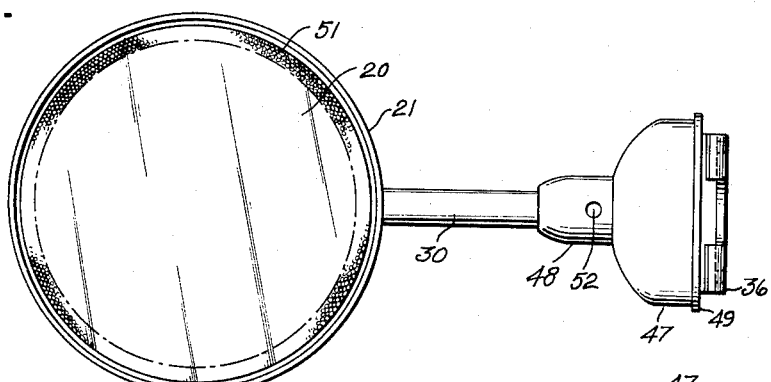
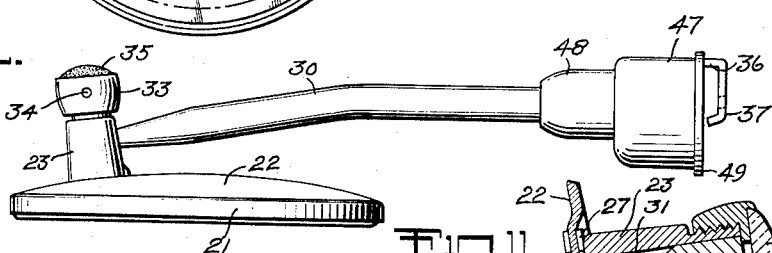
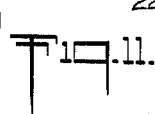
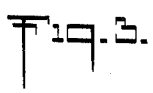
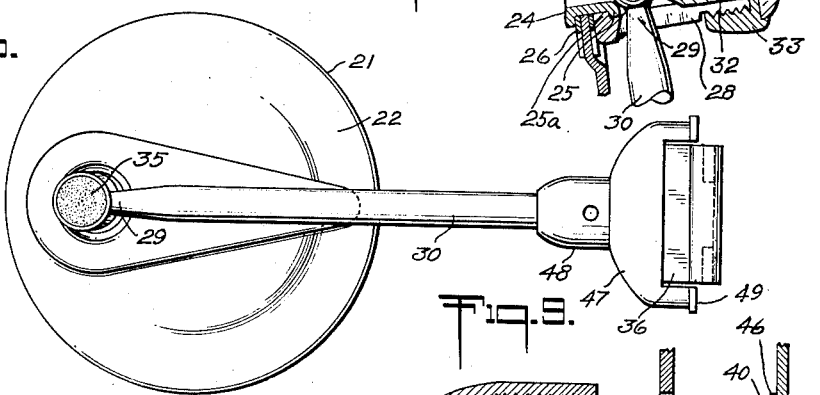
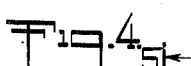
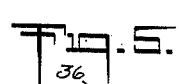
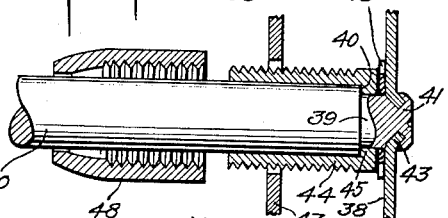
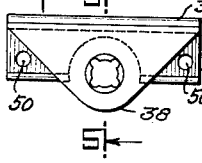
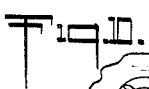
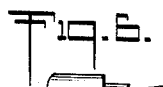
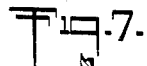
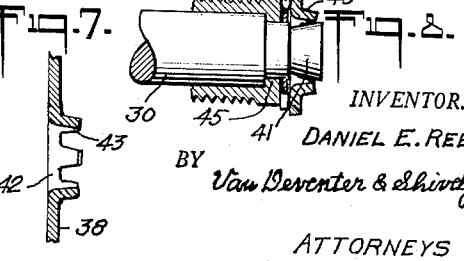
INVENTOR.
DANIEL E. REED.
BY Van Deventer & Shively,
ATTORNEYS Patented June 23, 1953

2,643,084

UNITED STATES PATENT OFFICE 2,643,084

REARVIEW MIRROR APPARATUS

Daniel E. Reed, Norwalk, Conn., assignor to Supersite Corporation, Bronx, N. Y., a corporation of New York Original application November 14, 1947, Serial No. 785,853. Divided and this application February 12, 1949, Serial No. 76,094

6 Claims. (Cl. 248—226)

The present invention pertains to improvements in rear view mirror apparatus and is a division of Serial Number 785,853, filed November 14, 1947, now Patent No. 2,599,412.

An object of the invention is to provide a rear-view mirror providing rear-view facilities for the driver of a vehicle in combination with warning means for drivers of approaching vehicles.

Another object is to provide a combination of the above nature providing warning to drivers approaching either from the rear or from ahead of the vehicle on which it is installed.

Another object is to provide improved swivel means joining the mirror frame to its supporting arm.

A further object is to provide improved means for securing the device to a vehicle.

A still further object is to provide improved means for permanently fastening the supporting arm to the securing means.

Other objects and advantages will become evident during the course of the following description in connection with the accompanying drawings, in which:

Figure 1 is a rear view of the mirror and supporting assembly;

Figure 2 is a top view of the same;

Figure 3 is a front view of the same illustrating the forward warning means;

Figure 4 is a detail view of the attaching clamp or stirrup view from its outer side;

Figure 5 is a detail sectional view of the same in the plane 5—5, Figure 4;

Figure 6 is a detail illustration of the inner end of the arm prior to its attachment to the stirrup or clamp;

Figure 7 is a fragmental sectional view of the clamp showing its preparation for riveting to the arm;

Figure 8 illustrates the arm, clamp and related parts positioned for riveting together;

Figure 9 is a similar view showing the completed riveted joint;

Figure 10 is a detail view of the riveted joint; and

Figure 11 is a detail sectional view illustrating the improved swivel, its method of attachment to the mirror frame, and the incorporation of the forward warning device in the swivel clamping cap.

Referring to Figures 1, 2 and 3, the numeral 20 designates a rear-view mirror mounted in a frame 21 having a convex back 22. A swivel sleeve 23, Figure 11, is rigidly secured to the back 22 by means of a hollow rivet 24 having an outer flange 25 overlying an inner flange 25a in the sleeve 23. Serrated lock washers 26 and 27, preferably of the type known as "Shakeproof," are disposed about the rivet 24 on the outside and inside of the back 22. It will be evident that the improved riveted joint, as illustrated, secures the swivel sleeve 23 rigidly to the back 22, eliminating the possibility of the sleeve loosening or turning in the back.

The sleeve 23 has a longitudinal slot 28 extending inward from its outer end to admit the neck 29 of a supporting arm or shank 30. The neck 29 terminates in a bell 31 engaging the open end of the rivet 24 in ball and socket relation. A plunger 32, slidably mounted in the sleeve 23, engages the outer side of the ball 31, and is pressed against the latter in adjustable clamping relation by a threaded cap 33. The cap 33 is preferably of circular exterior shape provided with adjusting spanner holes 34, Fig. 2.

A reflecting button or bull's-eye 35 is secured in the head of the cap 33. The button 35 is of suitable color adapted to reflect light from cars approaching from forward and thereby provide the drivers thereof with a warning indication of the lateral extent and position of the car carrying the mirror.

The shank 30 is curved to permit adjustment of the mirror 20 to the proper rear view angle, and its inner end is secured to a clamp stirrup 36, shown in detail in Figures 4 and 5. The stirrup in cross section is substantially U-shaped, having a forked clamping foot 37 adapted to engage the inner side of a door-rim, and an overlying lug 38 rigidly secured to the end of the shank 30 in the manner illustrated in Figures 6 to 10 inclusive.

Referring to Figures 6 and 7, the shank 30 has a portion 39 reduced to leave a shoulder 40. The end of the portion 39 in turn is conically necked down at 41. The lug 38 has a hole 42 adapted to allow passage of the conical portion 41 but of smaller diameter than the shoulder 40, the hole having extruded peripheral serrations or teeth 43. In assembly, an externally threaded bushing 44 is placed on the shank 30, the bushing having an interior flange 45 engaging the shoulder 40. A serrated lock washer 46 is placed on the reduced shank portion 39 and the conical end 41 is inserted in the hole 42. The shank 30 is firmly supported and riveting pressure is applied to the end of the assembly, bending the teeth 43 inward to grip the cone 41 and riveting the latter between and over the teeth to envelope and overlie the same, at the same time compressing the lock washer 46 between the bushing 44 and the lug 38 as shown in Figure 9.

In the above process a cross riveting tool may be employed to ensure thorough forcing of the shank metal between the teeth 43 as shown in Figure 10. By this means all elements of the joint are permanently secured together and rigidly locked both against separation and against relative turning either during installation or under the vibration and jar incident to operation of the vehicle.

A casing 47 slidable over the threaded bushing 44, is shaped to enclose the clamp 36. An internally threaded sleeve nut 48 is adapted to be screwed on the bushing 44, thereby moving the casing over the clamp. In installation, the foot 37 is hooked against the inside of the car's door-rim or the like and the casing 47 is forced against the exterior of the rim by means of the nut 48, thus firmly clamping the device in place. A resilient gasket 49, Figures 1, 2 and 3, may be provided on the edge of the casing 47 to prevent possible marring of the car's exterior finish.

The exterior of the nut 48 is of smooth circular shape and provided with spanner holes 52 for tightening and loosening. This construction, in addition to presenting an attractive appearance, is adapted to impede tampering or removal by unauthorized persons.

In the case of certain types of station wagons and the like, it is desirable to secure the device entirely to the exterior surface of the vehicle. For this purpose the foot 37 is provided with screw holes 50, Figure 4, allowing the foot to be fastened securely to the exterior surface of the car by suitable screws, after which the casing 47 is pressed inward against the car surface by means of the nut 48 to conceal the screw-heads and member 36 and to brace the fastening laterally.

In order to provide a rearwardly directed signal to following drivers, showing the lateral extent and position of the car on the road, the mirror 20 may have a border 51 of red or other suitable color surrounding the central view-reflecting portion. The border is of beaded or other suitable diffusive reflective construction whereby light from a following car striking the border creates a luminous colored ring visible as a warning to the following driver.

From the foregoing description it will be seen that the invention comprises a rear-view device providing for highly rigid and permanently shake-proof attachment to a vehicle. At the same time, the rigidly riveted attachment of the swivel sleeve 23 to the mirror frame and the firm clamping of the ball 31 between the hollow rivet 24 and the plunger 32 by means of the cap 33 prevent the sagging or other loss of proper position of the mirror, such as occurs in prior structures involving spring frictions and the like. It is also evident that the use of the mirror 20, the border 51 and the reflecting button or bull's-eye 35 combine in a single simple structure three related safety functions, namely giving the driver a view of objects behind while at the same time furnishing a warning indication of his car's lateral extent and position both to following drivers and to those approaching from the front.

While the invention has been described in preferred form, it is not limited to the exact structures illustrated, as various changes and modifications may be made without departing from the scope of the appended claims.

What is claimed is:

1. In a device of the character described, a bracket having a foot adapted to engage the inner side of an automobile door rim and an outer flat portion overhanging said foot, a shank having a reduced portion at its outer end, a threaded bushing on said shank having an interior flange embracing said reduced portion on said shank, means partly on said shank and partly on said overhanging portion of said bracket for securing said shank and bracket rigidly together with said interior flange of said bushing clamped between said shank and bracket, a casing adapted to enclose the outer portion of said bracket and to engage the outer side of said door rim, a resilient gasket on the engaging edge of said casing, said casing being perforated to allow passage thereof along said threaded bushing, and a threaded sleeve on said bushing and turnable to force said casing toward said foot.

2. A device as claimed in claim 1 wherein said means includes a necked down portion adjacent the end of said shank and protruding through a hole in said bracket portion, said hole having extruded circumferential teeth pressed inward to embrace said necked down portion, said end of said shank being riveted over to embrace and overlie said teeth.

3. A device as claimed in claim 1 wherein said foot is forked and includes a plurality of holes adapted to receive screws whereby said foot may be attached to an outer surface of said automobile, said casing being movable inward by said threaded sleeve to cover said screws and bracket and to press against said surface in lateral bracing relation.

4. In a device of the character described, a supporting bracket, a shank member having a reduced portion at its outer end, a threaded bushing, means partly on said shank and partly on said bracket for securing said shank and bracket together, said bushing having an interior flange clamped between said shank and said bracket, said shank lying within said bushing, a casing adapted to enclose said bracket, said casing having an aperture through which said bushing and shank member extend, and a nut freely slidable along said shank and adapted to engage said bushing and casing to force the latter toward said bracket as the nut is screwed on to the bushing.

5. The combination as claimed in claim 4 wherein said shank has a necked-down portion protruding through a hole in said bracket and said means is formed by said necked-down portion being riveted over to overlie said bracket.

6. In combination, a shank member, an interiorly threaded nut freely slidable along said shank and supported thereon, a lug adapted to form a support for said shank secured to the inner end thereof, means for securing said lug to a supporting surface, an internally threaded bushing secured to said lug and surrounding said shank where same is secured to the lug, and a casing adapted to surround said lug and to contact the supporting surface upon which said lug is mounted, said casing having an aperture therein through which said bushing freely extends whereby said threaded nut may be screwed on to said bushing to force said casing toward the aforesaid supporting surface.

DANIEL E. REED.

References Cited in the file of this patent

UNITED STATES PATENTS

| Number | Name | Date |
|---|---|---|
| 2,121,144 | Fischer | June 21, 1938 |
| 2,178,258 | Johnson | Oct. 31, 1939 |
| 2,248,833 | Thibault et al. | July 8, 1941 |
| 2,259,179 | Sauer | Oct. 14, 1941 |
| 2,282,746 | Putterman | May 12, 1942 |
| 2,299,280 | Reed | Oct. 20, 1942 |
| 2,361,764 | Golden | Oct. 31, 1944 |